Nov. 18, 1952
A. V. MRSTIK
2,618,669
TWO-STAGE ALKYLATION PROCESS
Filed April 15, 1950
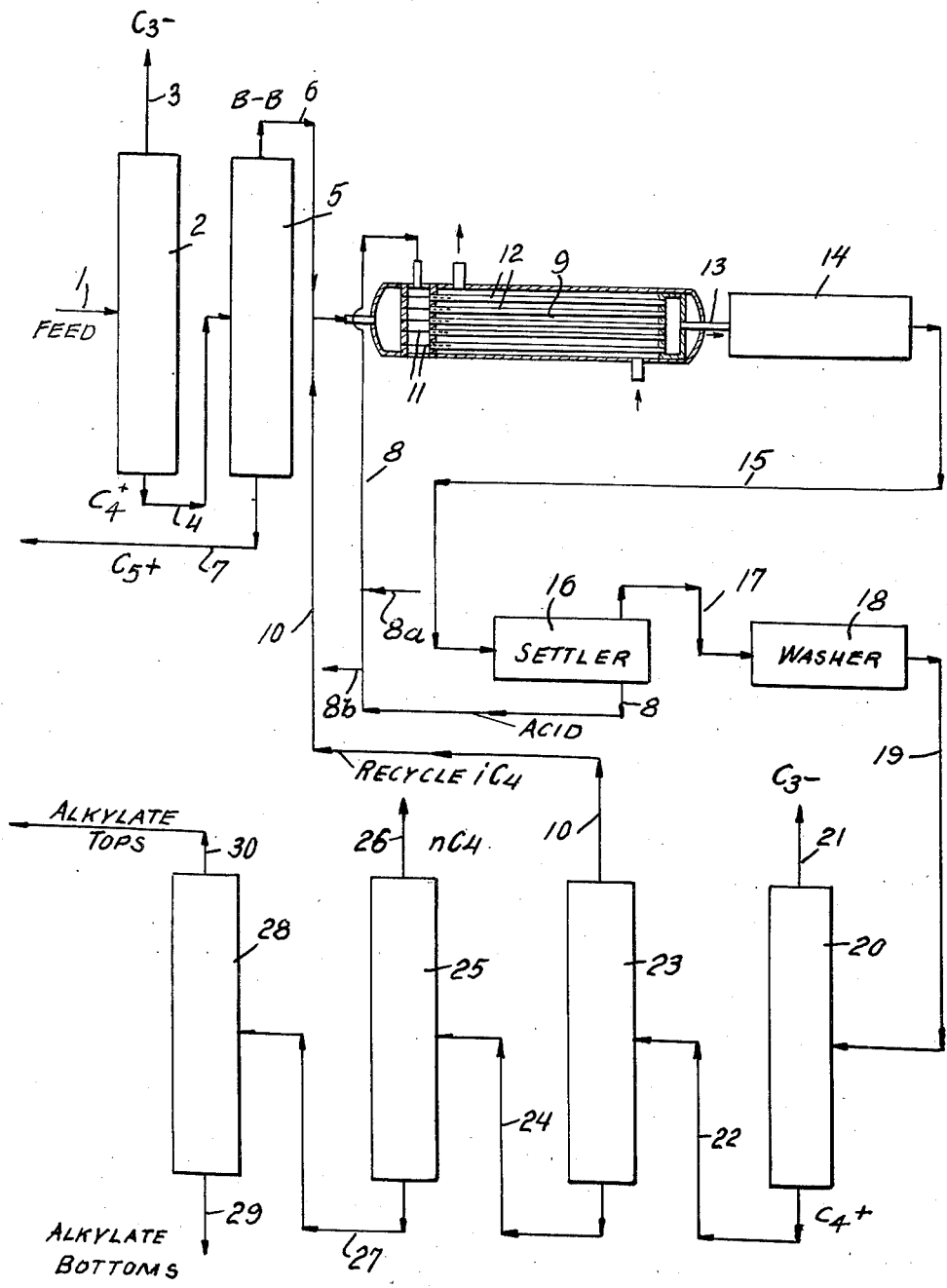
INVENTOR.
ADOLPH V. MRSTIK
BY
Adams, Forward & McLean
ATTORNEYS Patented Nov. 18, 1952

2,618,669

UNITED STATES PATENT OFFICE 2,618,669

TWO-STAGE ALKYLATION PROCESS

Adolph V. Mrstik, Harvey, Ill., assignor to Sinclair Refining Company, New York, N. Y., a corporation of Maine Application April 15, 1950, Serial No. 156,122

2 Claims. (Cl. 260—683.4)

My invention relates to an improved method for alkylating a tertiary paraffin with an olefin in the presence of a sulfuric acid catalyst.

In conventional alkylation processes, the reaction is carried out in one or more zones so as to provide sufficient time for conversion of the paraffin to the desired alkylate. However, even under satisfactory conditions of contact and reaction, considerable quantities of sulfuric acid catalyst are consumed in carrying out the reaction for any desired alkylate. It appears from my studies that the alkylation reaction occurs stepwise and the course of the reaction as well as the quality of alkylate obtained depends in large measure upon an initial, almost instantaneous reaction between olefin and acid resulting in the formation of an intermediate acid-olefin complex. A second major step in the course of the reaction, taking place in a considerably longer period of time, is the reaction of this intermediate with the paraffin to form the desired alkylate. In a system where all the reaction components are present for any period of time, side reactions occur such as the reaction of the olefin complex with fresh olefin. According to my studies, this reaction of the olefin with the intermediate product has a harmful effect upon product yield, product quality and acid consumption. As a result, excessive amounts of sulfuric acid are used to produce alkylates of inferior quality.

I have now devised an alkylation system for materially decreasing the consumption of sulfuric acid catalyst, while producing alkylates of appreciably higher quality. The process according to my invention is essentially carried out in two separate steps, an initial step where partial reaction takes place in an instantaneous period of time, and a second stage, where the reaction is carried out to completion in a considerably longer interval. By an instantaneous period of time I mean an extremely short time interval, a matter of only several seconds. Practically speaking, the reaction of the first stage takes place in a period up to five or six seconds in length. According to my invention, a mixture of paraffin and olefin is contacted in stream flow for an instantaneous period of time with a high ratio of sulfuric acid, by ejecting the olefin-paraffin mixture into a reaction tube, contacting the mixture at the point of ejection with acid, and passing the mixture, containing entrained acid, as a rapidly flowing stream out of the contact zone and into an enlarged reaction zone where sufficient time and agitation is provided to complete the alkylation reaction. Advantageously, the paraffin-olefin mixture is ejected as a plurality of streams into corresponding reaction tubes to accomplish particularly satisfactory results. The reaction mixture formed is then treated in a conventional manner to separate out the alkylated paraffin.

In an advantageous embodiment of my process wherein a mixture of paraffin and olefin is dispersed as a plurality of separate high velocity streams or jets, each such stream is individually contacted with sulfuric acid in reaction zones of limited cross-sectional area and length so that the reaction mixture is rapidly passed through and out of these zones in an instantaneous period of time sufficient only for partial reaction to take place. The short reaction period is largely controlled by the velocity of the paraffin-olefin feed streams and by the length and cross-sectional area of the reaction zones. The individual, partially-reacted streams are then collected and passed into a second, single reaction zone wherein the alkylation is carried out to completion in a considerably longer period of time. The alkylated paraffin is then separated from the reaction mixture. Thus, my process essentially carries out the reaction in two steps under conditions most favorable to the instantaneous and secondary reactions. My method also provides that the olefin intermediate product does not react with fresh olefin and also that fresh acid is initially reacted with, and is well dispersed in, the fresh olefin. In the first stage, a mixture of a tertiary paraffin, for instance isobutane or isopentane, and an olefinic constituent, say butylenes or amylenes or a mixture thereof, is advantageously formed into a plurality of separate high velocity streams or jets. Each such stream is preferably of relatively small cross-sectional area so as to provide for a maximum number of these streams in a limited working area. This may be accomplished by passing the reaction mixture through a plurality of individual tubes capped with nozzles; these capped tubes provide fast flowing feed streams, the velocity of which may be regulated by the exact nature of the cross-sectional area and the length of the tubes and the nozzle construction. Each of the streams so formed is then passed into contact with the acid in corresponding elongated reaction zones of small cross-sectional area and limited length. This may be accomplished by running the feed tubes into slightly larger reaction tubes so that at the juncture of the feed tubes with the reaction tubes there is an annular space formed for the introduction of acid. The reaction mixture, containing entrained acid, is then passed through these zones in an instantaneous period of time that ordinarily amounts to four or five seconds so that only partial reaction takes place, that is, formation of the intermediate olefin-acid complex product. The period of reaction is maintained to an absolute minimum by suitable regulation of the velocity of the feed streams as well as by the diameter of the reaction zones and their length. The quantity of the acid introduced, preferably in high ratio to the reactants, may be regulated to any desired rate as by pumping.

Spraying the olefin-paraffin reaction mixture as a plurality of small streams at high velocity into contact with the acid serves to give good olefin dispersion and mixture in the acid. In addition, the small cross-sectional area of these reaction zones and limited length tends to very rapidly remove the partially-reacted olefin molecules so as to reduce side reactions of undesirable nature since there is practically no chance for fresh olefin to contact the olefin-acid intermediate products. In any event, the greater the number of high velocity reaction streams that are sprayed into corresponding small reaction zones, the more improved will be the overall reaction due to better reactant contact and minimum period of initial reaction.

In this regard, in my copending application, Serial No. 156,121, filed April 15, 1950, I have disclosed an apparatus for carrying out this initial reaction stage. Essentially this apparatus comprises an elongated chamber divided into two separated compartments. Two sets of tubes of small cross-sectional area transverse the length of each such compartment and are so positioned as to be in communication with each other so that the tubes of one stage, the "feed" tubes, discharge from jet orifices into the tubes of the other set, the "reaction" tubes. The acid is introduced to the points where the feed tubes discharge into the "reaction" tubes. Advantageously the feed tubes are smaller than the reaction tubes, and the acid is introduced into the annular spaces formed at the junctures of the tube sets. The reaction tubes are refrigerated so as to regulate the reaction, which is exothermic. Forward and rear chambers may be provided for distributing and collecting the fluids passing through each set of tubes.

The emulsion formed in the first reaction stage, comprising excess sulfuric acid catalyst, acid-olefin intermediate products and unreacted paraffins, is then passed out of the individual reaction zones, collected and introduced into a second reaction chamber, which may be a Stratford, or any other conventional contactor, for completion of the alkylation reaction. The reaction period in the second zone is considerably longer than that in the first zone, i. e., it is the period of time necessary for completion of the alkylation reaction wherein the paraffin reacts with the acid-olefin intermediate to form the finished reactant. Usually about five to thirty minutes are required for completion of the reaction in the second zone. No fresh olefin, paraffin or acid is introduced into this second zone. The effluent from the second reaction zone is then treated in the usual manner for removal of the desired alkylate. For instance, the effluent from the second reaction stage is passed to an acid settler for removal of the acid, subjected to washing as with a caustic for removal of the excess acid by neutralization. Any propane, isobutane and butane constituents present in the mixture are removed by treatment in successive towers. The reaction product is then rerun to obtain the finished alkylate. The acid from the acid settler may be recirculated to the first reaction zone while the isobutane separated from the reaction product may be also recycled to the first reaction zone.

According to my invention, I react a mixture of tertiary paraffins with olefins in the presence of a sulfuric acid catalyst. As examples of suitable tertiary paraffins, there are isobutane, isopentane and so forth. Satisfactory olefins are, generally, the lower molecular weight olefins such as propylenes, butylenes and amylenes. I prefer to use a considerable excess of paraffin over olefin. That is, I have found it advantageous to use paraffin-olefin ratios higher than 1 to 1, such as 3 to 1 and higher. A very satisfactory reaction mixture is the so-called butane-butylene, "B—B", fraction derived from a cracked distillate, by substantial removal of the $C_3$ and lower fractions and $C_5$ and higher fractions. I use liquid sulfuric acid in high concentration, preferably in concentration as high as 98% or better. Although lower concentrations may be used, I have found it advantageous to remove acid from the system when the concentration falls below about 85 to 90%, or at least to add fresh acid to bring the concentration up to a higher level. The quantity of sulfuric acid employed may be varied considerably. Based upon the total reaction mixture, a quantity in the range approximating 20% to 80% by volume is satisfactory. Generally, I prefer to use in excess of 40% by volume of the acid, based on the total reaction mixture, and advantageously around 60%.

The reaction environment in each stage of the process according to my invention is carried out under conditions most suitable to each such stage. Although the pressure environment in each of the zones may be varied considerably, the pressure employed should be sufficient to maintain the reaction mixture in liquid phase. Therefore, the pressure in the reaction tubes of the first stage should be at least 40 to 50 pounds per square inch. As a result, the pressure in the feed tubes will necessarily be of considerably higher magnitude in order to provide a satisfactory pressure drop across the nozzles or orifices. I have found it advantageous to carry out the reaction of the first stage, resulting in the formation of olefin-acid intermediate products, at a temperature in the range approximating 0° to 60° F. The lower temperature limit in this stage is determined largely by the freezing point of the acid catalyst. Accordingly, for a high strength acid, the minimum satisfactory reaction temperature will be about 20° F. However, for weaker acid, a lower temperature can be used. In the second stage the reaction is carried out to completion at a temperature in the range approximating 30° to 80° F., for particularly satisfactory results.

The accompanying drawing is a somewhat schematic flow diagram of the process according to my invention.

According to the accompanying drawing, a distillate fraction, obtained from a cracking operation and rich in isobutane and butylenes, is charged to the system by line 1. The fraction is passed through depropanizing tower 2 for removing as overhead the $C_3$ and lighter fractions by line 3. The bottoms product from this tower, comprising the $C_4$ and heavier fractions, is passed to debutanizing tower 5 through line 4. In the debutanizing tower 5, the so-called B—B fraction, containing isobutane, normal butane, the isomeric butylenes and traces of propane and pentane is removed as overhead by line 6. The $C_5$ and heavier constituents are removed as bottoms by line 7. The B—B fraction is then passed to the first reaction zone 9 by line 6 wherein it is intimately admixed with sulfuric acid catalyst from line 8. Advantageously this reaction zone 9 comprises the reaction vessel I have described in my copending application Serial No. 156,121, referred to above. Additional isobutane may be added to the reaction mixture so as to provide the desired isobutane-olefin ratio by line 10, for instance, to provide an isobutane to olefin feed mixture of 3 to 1 or higher. The isobutane-olefin reaction mixture is then dispersed as a plurality of high velocity separate parallel streams by passing the mixture through a plurality of small diameter tubes 11, each terminating with jet nozzles. The high velocity streams upon emerging from the nozzle are then contacted with sulfuric acid catalyst from line 8, at the points where the reaction streams pass into the reaction zones making up the first reaction stage 9. The acid and olefin-isobutane reaction mixture dispersed as a plurality of jets then pass into corresponding tubes 12 of small cross-sectional area wherein the primary reaction is carried out in a very short period of time. The primary reaction is regulated by the velocity of the streams and the length and cross-sectional area of the reaction zones. The intermediate products formed, also containing excess acid and the saturated portion of B—B feed, are then collected by line 13 and passed to the second reaction zone 14, a Stratford or any other conventional alkylation contactor. In this zone the reaction is carried out to completion. The acid emulsion resulting from the second reaction zone is then taken off by line 15 and passed to the acid separation zone 16. In the acid separation zone 16, the acid layer is removed by line 8, and may be recycled as desired to the first reaction zone. Although the acid is added and discharged continuously in this illustrative process, if desired it may be added batchwise, as by using two acid settlers and alternately switching from the one containing depleted acid to a settler recharged with fresh acid. Impure acid may be bled from the system by line 8b while fresh acid may be added by line 8a. The reaction mixture from which the acid has been removed is then passed by line 17 to washing zone 18 wherein it is washed as with caustic for removal of acid and other impurities by neutralization. The washed product is then passed by line 19 to a depropanizing tower 20. In the depropanizing tower 20, the $C_3$ and lighter fractions are removed as overhead by line 21. The $C_4$ and heavier hydrocarbon fractions are taken off as bottoms by line 22 and passed to deisobutanizing tower 23. In the deisobutanizing tower 23, isobutane is taken off overhead by line 10 and may be recycled as desired to the first reaction zone 9. The remaining products are taken off as bottoms by line 24 and passed to debutanizing tower 25 wherein the normal $C_4$ fraction is removed as overhead by line 26. The alkylate fraction resulting is then taken off by line 27 as bottoms whereupon it is passed to tower 28 for rerunning. A bottoms product is taken off by line 29 and an overhead product by line 30, which may then be blended with lighter gasoline range hydrocarbons as desired.

By way of example to further illustrate my invention, I have found that alkylate products having octane ratings substantially the same as obtained in conventional practice will be produced at one half the expenditure of sulfuric acid catalyst and using, at the same time, a considerably lower paraffin to olefin reaction ratio. For instance, a conventional alkylation reaction to produce an alkylate of a given octane number will result in an acid consumption of about 35 to 40 pounds per barrel of alkylate at an isobutane to olefin ratio of about 5 to 1. In a process similar to that illustrated in the accompanying drawing, the acid consumed in producing an alkylate of the same octane rating will only be about 17 to 20 pounds per barrel of alkylate, at an isobutane-olefin ratio of 3 to 1. On the other hand, if the paraffin to olefin reaction ratio is maintained at a rate identical with a process of conventional practice, acid consumption will be halved while a finished alkylate with a substantially increased alkylate octane rating will be prepared.

I claim:

1. In the two stage alkylation of a tertiary paraffin with an olefin in the presence of sulfuric acid wherein in the first stage deleterious reactions between fresh olefins and acid-olefin complexes are advantageously inhibited, the improvement which comprises forming a flowing stream of a mixture of tertiary paraffin and olefin, directing said stream through an elongated first stage reaction zone of small transverse cross-section, contacting said stream of paraffin and olefin with a high ratio of sulfuric acid for an instantaneous period of time sufficient for only a partial reaction by injecting said acid directly into said first stage reaction zone and with the current of said stream, regulating the flow of the resulting reaction stream to insure the immediate removal of the formed acid-olefin complexes from the incoming fresh olefin to prevent deleterious reactions therewith, passing the reaction stream as a rapidly flowing stream from said first stage reaction zone into an enlarged second stage reaction zone where sufficient time and agitation is provided to complete the alkylation reaction, and separating the alkylated paraffin from the reaction mixture.

2. In the two stage alkylation of a tertiary paraffin with an olefin in the presence of sulphuric acid wherein in the first stage deleterious reactions between fresh olefins and acid-olefin complexes are advantageously inhibited, the improvement which comprises forming a plurality of separate flowing streams of a mixture of tertiary paraffin and olefin, directing said streams through elongated first stage reaction zones of small transverse cross-section, contacting individually said streams of paraffin and olefin with a high ratio of sulfuric acid for an instantaneous period of time sufficient for only a partial reaction by injecting said acid directly into said first stage reaction zones and with the current of said streams, regulating the flow of the resulting reaction streams to insure the immediate removal of the formed acid-olefin complexes from the incoming fresh olefin to prevent deleterious reactions therewith, collecting the individual reaction streams and passing them as a single rapidly flowing stream from said first stage reaction zones into an enlarged second stage reaction zone where sufficient time and agitation is provided to complete the alkylation reaction, and separating the alkylated paraffin from the reaction mixture.

ADOLPH V. MRSTIK.

REFERENCES CITED

The following references are of record in the file of this patent:

UNITED STATES PATENTS

| Number | Name | Date |
|---|---|---|
| 1,616,209 | Weisgerber | Feb. 1, 1927 |
| 2,267,097 | Hatch et al. | Dec. 23, 1941 |
| 2,344,015 | Allred | Mar. 14, 1944 |
| 2,347,999 | Elliott et al. | May 2, 1944 |
| 2,357,607 | Ocon et al. | Sept. 5, 1944 |
| 2,454,869 | Goldsby et al. | Nov. 30, 1948 |
| 2,491,618 | Luetzelschevab | Dec. 20, 1949 |